US007290683B2

(12) United States Patent
Gerenraich

(10) Patent No.: US 7,290,683 B2
(45) Date of Patent: Nov. 6, 2007

(54) SECURE SURFACE MOUNTED DISPENSING SYSTEM

(75) Inventor: Kenneth B. Gerenraich, Laguna Hills, CA (US)

(73) Assignee: Gerenraich Family Trust, Laguna Hills, CA (US)

( * ) Notice: Subject to any disclaimer, the term of this patent is extended or adjusted under 35 U.S.C. 154(b) by 286 days.

(21) Appl. No.: 11/042,676

(22) Filed: Jan. 25, 2005

(65) Prior Publication Data

US 2006/0163285 A1 Jul. 27, 2006

(51) Int. Cl.
*B67D 5/06* (2006.01)
*B25G 3/16* (2006.01)

(52) U.S. Cl. ................. 222/180; 222/173; 222/153.09; 222/153.03; 403/349; 403/315; 248/205.5

(58) Field of Classification Search ................ 222/173, 222/180, 181.1–181.3, 153.03, 153.09; 248/309.1, 248/223.41, 224.51, 224.61, 205.5; 403/348, 403/349, 315, 316
See application file for complete search history.

(56) References Cited

U.S. PATENT DOCUMENTS

| | | | | |
|---|---|---|---|---|
| 2,317,729 A * | 4/1943 | Bruno | ........................ | 285/377 |
| 4,135,838 A * | 1/1979 | Vandenberg | ................ | 403/316 |
| 5,018,901 A * | 5/1991 | Ferree et al. | ............... | 403/349 |
| 5,413,251 A * | 5/1995 | Adamson | .................... | 222/129 |
| 5,423,568 A * | 6/1995 | Zushi et al. | ............ | 280/728.2 |
| 5,427,406 A * | 6/1995 | Zushi et al. | ............ | 280/728.2 |
| 5,480,068 A * | 1/1996 | Frazier et al. | ......... | 222/153.03 |
| 5,483,808 A * | 1/1996 | Barbazza | .................... | 63/15.5 |
| 5,613,625 A * | 3/1997 | Specht | ....................... | 222/180 |
| 6,209,184 B1 * | 4/2001 | Copeland et al. | ............. | 29/428 |
| 6,217,248 B1 * | 4/2001 | Reiff | ........................... | 403/24 |
| 6,302,617 B1 * | 10/2001 | Rumpp | ....................... | 403/348 |
| 6,772,913 B2 * | 8/2004 | Garcia et al. | .......... | 222/153.09 |
| 6,772,916 B1 * | 8/2004 | Reynolds | ................. | 222/181.3 |
| 6,834,838 B2 * | 12/2004 | Dennis et al. | ........... | 248/311.2 |
| 6,962,272 B2 * | 11/2005 | LeBlond | ..................... | 222/180 |

* cited by examiner

*Primary Examiner*—Kevin Shaver
*Assistant Examiner*—Stephanie E. Tyler
(74) *Attorney, Agent, or Firm*—Walter A. Hackler

(57) ABSTRACT

Flush mount dispensing bottle and apparatus includes a bracket having a mounting flange and a bottle having a flat back with an embossment for receiving the flange and enabling the flat back to flushly contact a surface supporting the bracket. A button attachable to the surface at a spaced apart distance from the bracket is provided and a second embossment receiving the button enables the flat back to flushly contact the surface and further prevents unauthorized removal of the bottle from the bracket.

3 Claims, 2 Drawing Sheets

SECURE SURFACE MOUNTED DISPENSING SYSTEM

The present invention is generally related to surface or wall mounted dispensers suitable for measuring and delivering into a users hand a small uniform quantity of liquids or viscous liquids such as soaps, creams, paste and lubricants.

Many designs of liquid dispensers, particularly liquid soap dispensers, are, well known in the art. Such dispensers typically are employed in public restrooms and the like and usually include a mounting bracket to permanently affix the dispenser to a wall. Such dispensers also include an access port of same type in order that the dispenser may be serviced by a maintenance worker for refilling.

Other types of dispensers utilize refill cartridges that are inserted into a housing structure. All such dispensers rely on continued maintenance and operability of the housing, which is permeably affixed to a wall.

In order to service such dispensers, a supply system must be utilized for storing additional liquid soap or the like which is thereafter transported and loaded into the dispenser. It should be apparent that this maintenance entails considerable time and logistics.

In addition, if the dispenser is damaged or vandalized, replacement thereof involves the removal of the entire housing from the wall and the reinstallation of a new dispenser housing.

The present invention is an improvement over such existing dispensers in that it provides a self-contained dispenser, which may be disposable or refillable. The refilling of the dispenser may be done in a central location and accordingly does not depend upon the time consuming onsite refilling of heretofore utilized wall-mounted dispensers. In addition, the present invention provides for a secure mounting system inhibiting removal without the use of a release tool.

SUMMARY OF THE INVENTION

Flush mount dispensing bottle bracket apparatus in accordance with the present invention generally includes a bracket having a mounting flange along with a bottle having a flat back with an embossment for receiving the flange and further enabling the flat back to flushly contact a surface supporting the bracket.

This structure inhibits tampering of the dispensing bottle in view of the fact there are no members which are accessible to vandals.

More particularly, the present invention further includes a button attachable to the surface at a spaced apart distance from the bracket and a second embossment is provided in the flat back for receiving the button. This arrangement further enables the flat back to flushly contact the surface and in addition prevents unwanted removal of the bottle from the bracket by unauthorized personnel.

For maintenance requiring refilling of the bottle, a maintenance worker may simply replace the empty or partially full dispenser bottle with a full bottle utilizing a release tool.

The empty or partially full bottles may thereafter be reloaded at a central site. Accordingly, the present invention may include a system which includes a plurality of bottles and a bracket for supporting one of the bottles with the remaining bottles being utilized for on-site refilling.

In one embodiment of the present invention, the bracket includes a protruding hub having opposing female bayonet grooves therein and the embossment includes opposing studs for engaging the bracket grooves upon alignment and turning of the bottle with the hub inserted into the embossment.

More particularly, the mounting flange may include openings for receiving threaded screws with the screws fixing the bracket to a suitable surface. Correspondingly, the embossment includes a circular groove receiving the screw heads to facilitate the flush mounting of the flat back and enable turning of the bottle into the hub for causing securing and releasing of the bottle to and from the bracket.

As hereinabove noted, the present invention further includes a release tool which is insertable between the bottle and the surface proximate the button. Movement of the release tool separates the button from the second embossment and resiliency of the flat back enables such separation and removal of the bottle from the bracket. This structure inhibits unauthorized removal of the bottle from the bracket and surface.

In another embodiment of the present invention, mounting flange includes a protruding triangular wedge and the embossment includes a corresponding female triangular wedge for engaging the protruding wedge.

BRIEF DESCRIPTION OF THE DRAWINGS

The advantages and features of the present invention will be better understood by the following description when considered in conjunction with the accompanying drawings in which.

DETAILED DESCRIPTION

Figure 1:
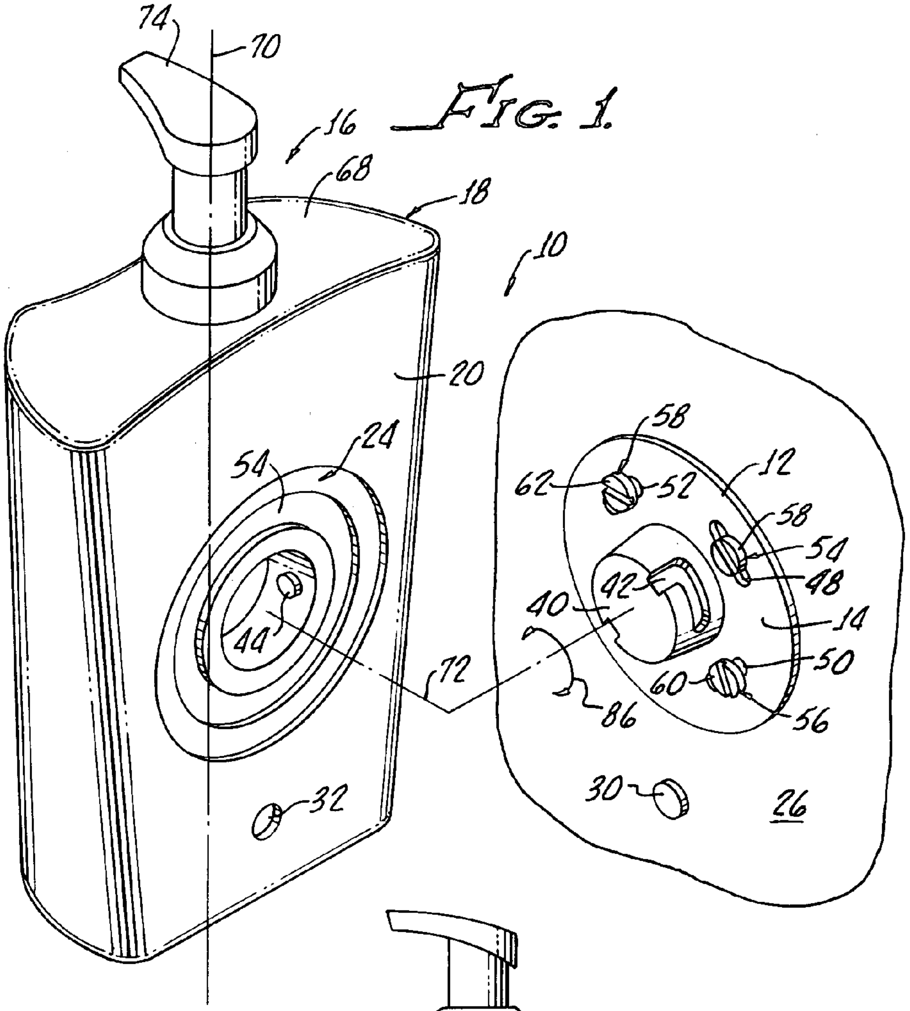
FIG. 1 is a perspective view of the bottle and the bracket apparatus in accordance with the present invention generally showing the bottle and the bracket in a spaced apart relationship in order to show a bracket having a flange along with a bottle having a flat back with an embossment therein for receiving a flange.
Figure 2:
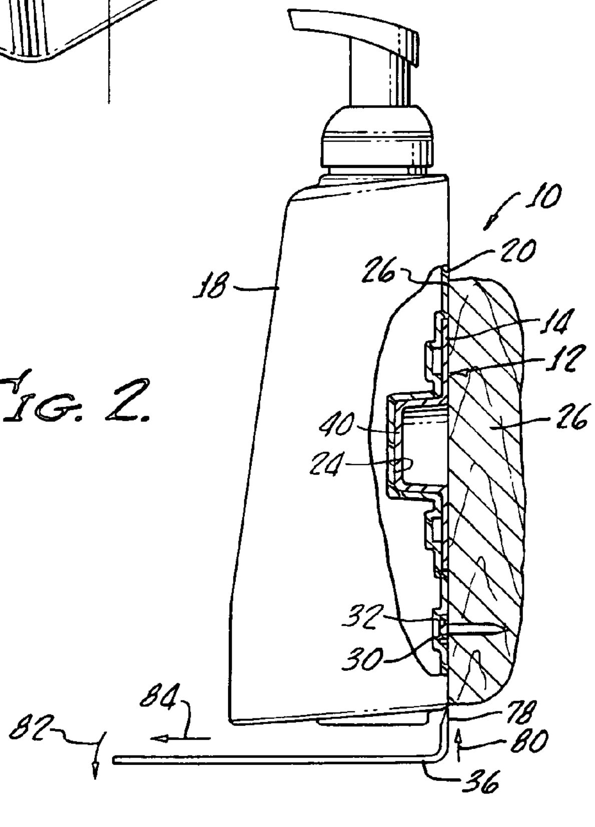
FIG. 2 is a side view of the bottle and bracket shown in FIG. 1 in partial cross section showing engagement of the embossment with a bracket and flush mounting of the flat back of the bottle against a mounting surface.

With reference to FIGS. 1 and 2, there is shown flush mount dispensing bottle and bracket apparatus 10 generally including a bracket 12 having a mounting flange 14 and a bottle 18 having a flat back 20 which includes an embossment 24 for receiving the flange 14 and enabling the flat back to flushly engage a surface 26 supporting the bracket 12, as more clearly shown in FIG. 2.

A button 30 attachable to the surface 26 by any conventional manner is disposed at a spaced apart distance from the bracket 12 and a second embossment 32 is provided in the flat back 20 for receiving a button 30 and further facilitating flush contact between the flat back 20 and the surface 26, as illustrated in FIG. 2. The button functions to prevent, or inhibit, unauthorized removal of the bottle 18 from the bracket 12.

Preferably, the bottle 18 is molded from plastic and any bracket 12 may be either plastic or metal. A suitable plastic provides resiliency for enabling the bottle 18 to be removed from the bracket 12 utilizing a release tool 36, see FIG. 2, as will be hereinafter discussed in greater detail.

In the embodiment shown in FIGS. 1 and 2, the bracket 12 includes a protruding hub 40, which includes opposing female bayonet grooves and the embossment 24 includes opposing studs 44 aligned for engaging the bracket grooves 42 upon alignment and turning of the bottle embossment 24 with the hub 40 inserted thereinto.

The mounting flange 14 may include openings 48, 50, 52 for receiving threaded screws 54, 56, 58 and the embossment 24 further includes a circular groove 54 for receiving screw heads 58, 60, 62 thereby enabling a flat back 20 to turn into the hub 40 to cause securing and releasing of the bottle 18 to and from the bracket 12.

A dispensing pump 66, which may be conventional in nature, is disposed at a top 68 of the bottle 18 upon an axis 70 which is perpendicular to an embossment axis 72 in order that actuation of a dispenser plunger 74 does not apply any rotational torque to the bottle 18. This prevents dislodgement of the bottle 18 from the bracket 12 during operation of the dispenser 66.

The release tool 36, as shown in FIG. 2, may be a simple lever device which includes a tip 78 insertable between the bottle back 20 and as indicated by the arrow 80 and when moved, or pivoted, as indicated by the arrow 52, releases the flat back 20 from the surface 20, as indicated by the arrow 84, thus enabling rotation of the bottle 18 with respect to the bracket 12, as indicated by the arrow 86, see FIG. 1.

Figure 3:
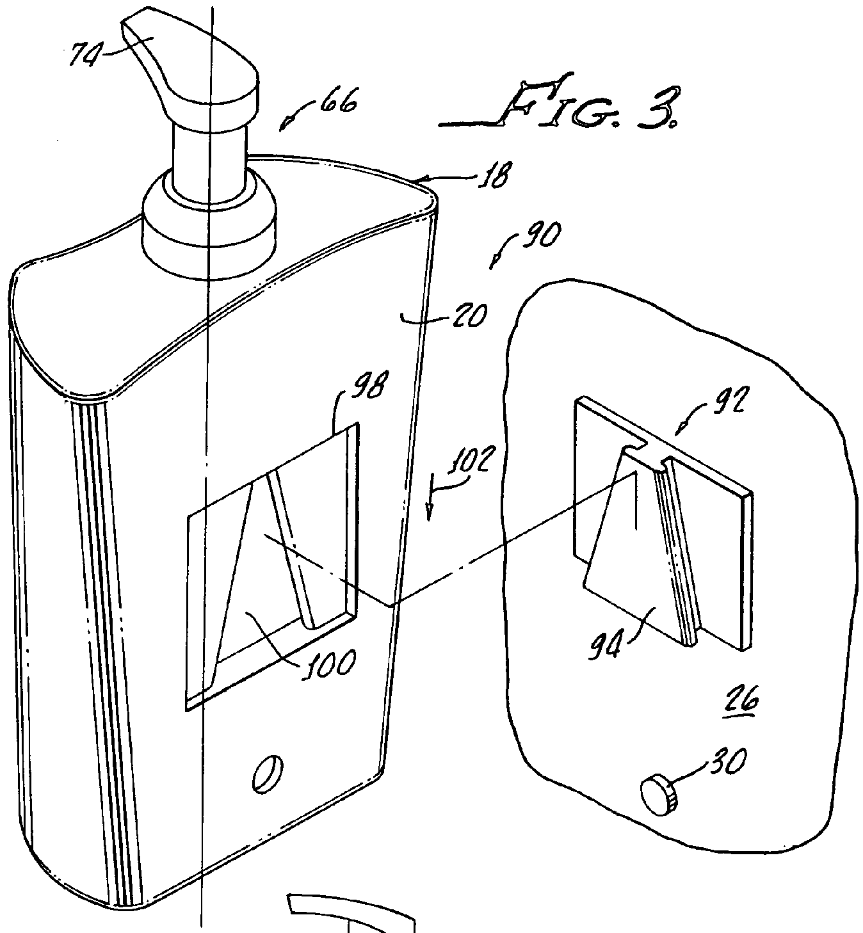
FIG. 3 is a perspective view of another embodiment of a bottle and bracket in accordance with the present invention showing the bottle and bracket in a spaced apart relationship in order to show a bracket with a protruding wedge and an embossment in a bottle back corresponding thereto with a female configuration for engaging a protruding wedge along with a security button and a second embossment in the bottle back for receiving same.

With reference to FIGS. 2 and 3, there is shown an alternative embodiment 90 of the present invention, common reference characters indicating identical or substantially similar components hereinbefore discussed in connection with the embodiment 10 shown in FIGS. 1 and 2.

In this embodiment 90, a mounting flange includes a protruding triangular wedge 94, the flange 92 being attached to the surface 26 by either an adhesive 96 or by recessed screws (not shown) or any other conventional attachment device (not shown).

Figure 4:
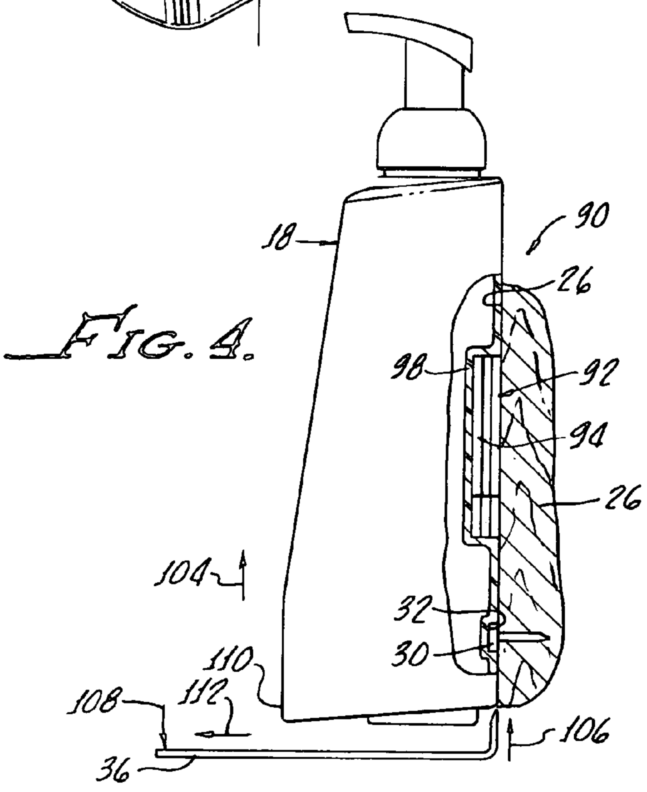
FIG. 4 is a side view of the bottle and bracket shown in FIG. 3 and partial cross section showing engagement of the embossment with the bracket and a second embossment engaging the button, also shown is a release tool for facilitating a removal of the bottle from the bracket by authorized personnel.

The flat back 20 of the bottle 18 includes an embossment 98, which includes a corresponding female triangular wedge sized and shaped for engaging the protruding triangular wedge 94 by downward movement of the bottle 18 onto the flange 92, as indicated by the arrow 102 in FIG. 3. Engagement of the bottle 18 with the flange 92 and wedge 94 against the surface 26 is shown in FIG. 4. Also shown is engagement of the button 30 with the second embossment 32 on the bottle flat back 20.

This engagement inhibits unauthorized removal of the bottle 18 from the surface 26 by lifting of the bottle as indicated by the arrow 104 in FIG. 4.

As with the apparatus 10 shown in FIGS. 1 and 2, the release tool 36 functions, when inserted between the bottle 18 and the surface 26 as indicated by the arrow 106 in FIG. 4, to separate the second embossment 32 from the button 30 when the tool 36 is actuated, or rotated, in a direction indicated by the arrow 108 to cause outward movement of a bottle bottom 110, as indicated by the arrow 112, which then enables removal of the bottle 18 from the bracket flange 92, as indicated by the directional arrow 104 in FIG. 4.

Although there has been hereinabove described a specific secure surface mounted dispensing system in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A flush mount dispensing bottle and bracket apparatus comprising:

a bracket having a mounting flange;

a bottle having a flat back with an embossment receiving the flange and enabling the flat back to flushly contact a surface supporting said bracket;

a button attachable to said surface at a spaced apart distance from said bracket; and a second embossment receiving said button and enabling the flat back to flushly contact the surface and preventing unauthorized removal of said bottle from said bracket; wherein said bracket includes a protruding hub having opposing female bayonet grooves therein and said embossment includes opposing studs engaging the bracket grooves upon alignment and turning of said bottle embossed with the hub inserted into said embossment.

2. The apparatus according to claim 1 wherein said mounting flange includes opening receiving threaded screws, said screws fixing said bracket to said surface, and said embossment includes a circular grooves receiving screw heads enabling the flat back to turn into the hub to cause securing and releasing of said bottle to and from said bracket.

3. The apparatus according to claim 2 further comprising a release tool insertable between said bottle and said surface proximate said button, movement of said release tool separates said button from said second embossment, resiliency of said flat back enabling removal of said bottle from said bracket.

* * * * *